[11] 3,573,459

[72] Inventor Walter P. Siegmund
 Woodstock, Conn.
[21] Appl. No. 811,397
[22] Filed Mar. 28, 1969
[45] Patented Apr. 6, 1971
[73] Assignee American Optical Corporation
 Southbridge, Mass.

[54] COUPLED FIBER OPTIC FACEPLATES
 4 Claims, 4 Drawing Figs.
[52] U.S. Cl........................................ 250/80,
 350/96, 313/65, 313/92
[51] Int. Cl...................................... G02b 5/16
[50] Field of Search............................ 350/96;
 313/65, 92 (L.F.); 250/80

[56] References Cited
 UNITED STATES PATENTS
2,992,587 7/1961 Hicks et al.................. 350/96(B)
3,141,105 7/1964 Courtney-Pratt............. 350/96(B)X
*Primary Examiner*—David H. Rubin
*Attorneys*—William C. Nealon, Noble S. Williams and Robert J. Bird ABSTRACT: Fiber optical faceplates adapted to be coupled together in close physical contact to transfer light from one faceplate into the other with increased efficiency.

Patented April 6, 1971  3,573,459

INVENTOR.
WALTER P. SIEGMUND
BY Noble D. Williams
ATTORNEY

COUPLED FIBER OPTIC FACEPLATES

BACKGROUND OF THE INVENTION

1. Field of the Invention

Fiber optical faceplates with particular reference to coupled faceplate structures and systems.

2. Description of the Prior Art

In electron-optical systems such as image amplifiers which are made up of cascaded image converter tubes each having input and output fiber optic faceplates formed of clad optical fibers, the efficiency of coupling, i.e. placing one plate in physical contact with the other, is limited by the percentage of total area devoted to cladding on the light accepting face of the receiving plate. Being made up of many thousand extremely small fibers each, fiber optic plates of the type to which this invention is directed cannot be expected to have their respective cladding areas exactly lined up at a coupling interface. Accordingly, light which becomes incident upon the cladding area of a receiving plate is absorbed by the cladding and a light loss of from 20 to 25 percent is typical in high resolution plates.

The present invention overcomes the problem of light loss due to absorption in claddings of fibers of coupled fiber optic plates whereby a significant increase in coupling efficiency is realized.

SUMMARY OF THE INVENTION

In systems of fiber optic faceplates made up of thousands of extremely thin, clad optical fibers intended to be coupled together in close physical contact so as to transfer light from one plate to the other, it cannot be expected that ends of the cladding material in a light receiving plate will exactly line up with adjacent ends of cladding material in an emitting plate. Thus, a substantial amount of light intended to be transferred by the coupling will become incident upon ends of cladding material in the receiving plate at the coupling interface. This amount of light which, in high resolution plates, is typically in the order from 20 to 25 percent of the total light intended to be transmitted through the coupling is absorbed by the cladding material of the receiving plate and constitutes a significant loss in image intensity.

According to the present inventive concept, the ends of the fiber cladding materials at the light accepting face of a receiving fiber optic faceplate are coated with a highly light reflecting material such as silver so as to reflect the light which is incident upon the cladding area back into fiber cores of a light emitting plate coupled thereto. This light is returned through the cores of the emitting plate by internal reflection to its entrance face which is usually coated with a diffusely reflecting phosphor layer. The light will then be returned through the emitting plate by reflection from the phosphor layer along different paths to the coupling interface whereupon it will have an opportunity to enter fiber cores of the light receiving plate.

It is also contemplated that ends of fiber cladding material adjacent the phosphor coating on the light emitting plate may also be coated with a light reflecting material which will prevent light produced in the phosphor layer from entering adjoining cladding materials. In such a case, light produced in the phosphor layer which would ordinarily enter the fiber cladding material and become absorbed thereby will, instead, be reflected back into the phosphor layer and diffusely reflected by the layer into fiber cores of the emitting plate.

In coupled faceplates having ends of their fiber claddings rendered light reflecting as just described, an efficiency even as low as 50 percent in returning light back into core parts of the faceplate fibers will increase the overall coupling efficiency by as much as 10 percent.

The present invention will be be more fully understood by reference to the following detailed description and the accompanying drawing.

DESCRIPTION OF THE PREFERRED EMBODIMENT

The present invention relates more particularly to fiber optic faceplates which are intended to be coupled together in close physical contact so as to transfer light from one plate into the other as, for example, in an image intensifying system comprised of a number of cascaded optical image converter tubes.

Figure 1:
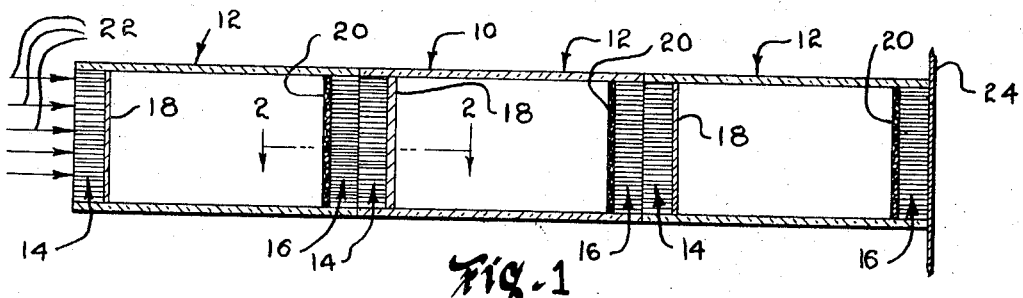
FIG. 1 is a diagrammatic illustration, in cross section, of a system of cascaded image converter tubes in which an embodiment of the invention is incorporated.

In FIG. 1 an exemplary image intensifying system 10 includes a number of image converter tubes 12 each having a light receiving fiber optic faceplate 14 and a light emitting fiber optic faceplate 16. Internally of tubes 12, each plate 14 is provided with a photosensitive cathode coating 18 and plates 16 are provided with phosphor coatings 20.

Tubes 12 are cascaded with their respective emitting and receiving plates 16 and 14 placed in close physical contact with each other. Image forming light indicated by arrows 22 incident upon plate 14 at one end of system 10 is transferred by the principles of total internal reflection to a first photosensitive cathode coating 18. An electron accelerating and focusing system (not shown) within the first tube 12 forms an intensified electron image upon phosphor coating 20 thereof. The intensified image is reconverted by the phosphor into image forming light which is then transmitted through the first fiber optic emitting plate 16 of system 10 into a second fiber optic receiving plate 14, and so on through all of tubes 12 to the last light-emitting plate 16 of the system. A photosensitive film 24 or other recording or image receiving means may be placed against the emitting face of this plate to receive and record the intensified image forming light produced by system 10.

Those interested in greater details of image intensifying systems such as system 10 of FIG. 1 may refer to U.S. Pat. No. 3,321,658 and it should be understood that the aforementioned electron accelerating and focusing means may include electron multiplying channel plates and the like.

Figure 2:
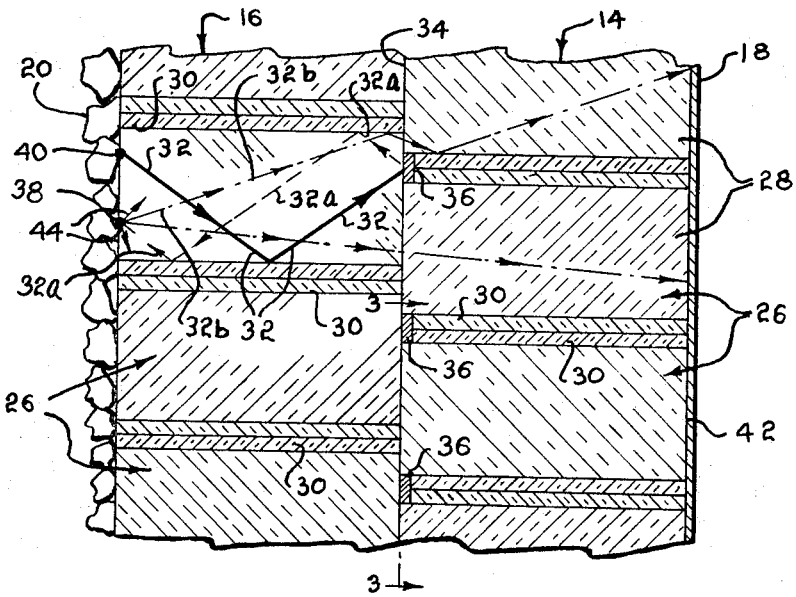
FIG 2 is a greatly enlarged cross-sectional view taken generally along line 2–2 of FIG. 1.

Referring more particularly to FIG. 2, it can be seen that plates 14 and 16 are formed of optical fibers 26 which, for purposes of better illustrating principles of this invention, have been shown as being comparatively short and of large diameter while, in reality, such fibers are long and very slender as it is well known in the art. Each optical fiber 26 in the present case is of the well-known type having a core 28 of high refractive index light-conducting material surrounded by a cladding 30 of relatively low refractive index material which forms an internally light-reflecting interface along the length of the fiber core whereby the fiber will conduct light from one of its ends to the other by total internal reflection. Fibers 26 in each of face plates 14 and 16 are fused together in side-by-side relationship with each other so that claddings 30 thereof are so united as to form a gastight matrix between cores 28.

The coupling of plates 14 and 16 for the purpose discussed with relation to FIG. 1 simply involves bringing their exposed faces into physical contact with each other as illustrated. However, since it is extremely difficult and impractical to attempt to line up ends of the cladding material in one plate with those of the other plate and such alignment is not expected, it has been necessary heretofore to accept a light loss in the transfer of light from one plate 16 to another 14 by absorption in the cladding material of the receiving plate. A beam of light which would ordinarily be so absorbed is indicated by arrows 32 in FIG. 2.

According to principles of the present invention, ends of cladding 30 adjacent face 34 of plate 14 (FIG. 2) are slightly recessed and filled with a highly reflecting material 36 such as silver so that light becoming incident thereupon will be reflected back into cores 28 of the emitting plate 16. Therein, the light will return by total internal reflection to the diffusely reflecting phosphor coating 20 and become at least partially reflected toward plate 14 for a return along one or more different optical paths to the coupling interface and reception by one or more cores 28 of plate 14 rather than by ends of cladding 30. Portions of such returned light happening to again become incident upon reflecting material 36 will be similarly returned to phosphor coating 20 and at least partially back to the coupling interface repeatedly until eventually reaching a point of incidence at the interface where the light will be received by cores 28 of plate 14.

The effect of the aforesaid rerouting of light which becomes incident upon ends of cladding 30 (reflecting material 36) of plate 14 is illustrated in FIG. 2 with beam 32 being exemplary of such light.

Beam 32 resulting from excitation of phosphor coating 20 by electron bombardment thereof and becoming incident upon reflecting material 36 is reflected as indicated by broken lines 32A back to phosphor coating 20 into incidence thereupon at a point 38 spaced from its point of origin 40. Upon being diffusely reflected by phosphor 20 back into plate 16, at least portions of the light are returned along different paths (e.g. those illustrated by dash lines 32B) so as to become incident upon one or more cores 28 of fibers 26 in plate 14. Upon entering fiber cores 28 in plate 14, light rays 32B will become transmitted therethrough by the well-known principles of total internal reflection and received by cathode coating 18. Other portions of light 32A diffusely reflected from phosphor coating 20 as indicated by arrows 44 will be returned to plate 14 along paths (not shown) and become incident upon cores 28 of plate 14. Thus, a substantial portion of the original beam of light 32, instead of being absorbed by claddings 30 of plate 14 will be transferred through plate 14 as active image forming light contributing to the stimulation of cathode coating 18.

In providing a faceplate such as 14 with reflecting material 36 upon ends of fiber claddings thereof, the recessing of the cladding ends may be accomplished by forming the plate of fibers 26 having claddings 30 which are preferentially etchable in acid or alkaline solutions. Such fibers may comprise core parts 28 of high refractive index flint glass having claddings 30 of a lower refractive index borosilicate glass.

Figure 3:
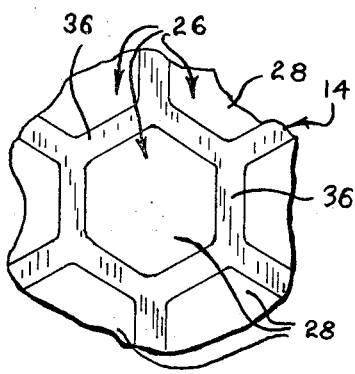
Fig. 3 is a fragmentary end view of the embodiment of the invention illustrated in FIG. 2 looking in the direction indicated by arrows 3–3.

Upon construction of the faceplate with preferentially etchable cladding material and polishing of its face 34, etching of claddings 30 to a depth of from 1 to 2 microns will produce adequate recessing thereof. The entire face 34 may then be coated by chemical or vapor deposition with a highly reflective metallic coating such as silver or aluminum. Removal of the metallic deposit from ends of cores 28, e.g. by again polishing surface 34, will leave reflecting material 36 covering only the ends of claddings 30 as shown in FIG. 3.

It should be understood that other methods for producing reflective coatings discriminately upon ends of cladding 30, such as by masking ends of cores 28 during application of the coatings, may be employed.

Figure 4:
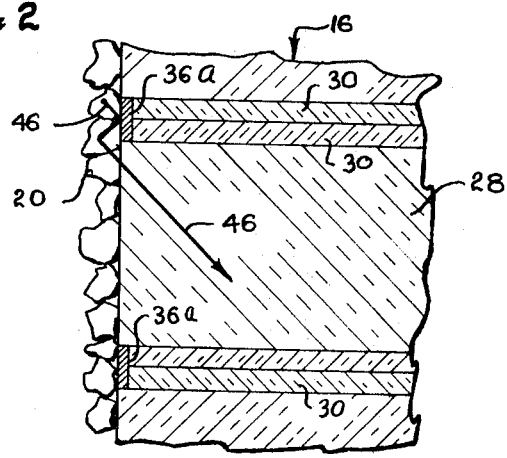
Fig. 4 is a greatly enlarged fragmentary cross-sectional view of a modification of the invention.

The light transmitting efficiency of coupled faceplates such as are illustrated in FIG. 2 may be further enhanced by the provision of highly light-reflecting material on ends of cladding 30 of emitting face plate 16 adjacent its phosphor coating 20, as illustrated in FIG. 4. Light reflecting material 36A in such a case will function to redirect light rays incident upon claddings 30 back into phosphor coating 20 for reflection by phosphor coating 20 back into faceplate 16 along one or more different paths leading into the fiber cores. For example, a light ray 46 (FIG. 4) produced by electron bombardment of phosphor coating 20 which would normally enter claddings 30 is reflected by material 36A back into coating 20 and at least partially redirected or diffusely reflected by the coating into one of cores 28 of plate 16. Thus, in addition to increasing the coupling efficiency in coupled systems of face plates, a further increase increase in the efficiency of light transmission in such systems may be accomplished by incorporation of the embodiment of the invention illustrated FIG. 4.

I claim:

1. In a system of coupled fiber optical faceplates wherein the plates each comprise a great number of individually clad juxtaposed light-conduting fibers joined together with their corresponding opposite ends forming light-receiving and light-emitting faces in the system and at least one of each of said faces are coupled together, the improvement comprising:
   the remaining light-receiving face in the system having a diffusely reflective light-emitting layer of phosphor thereon;
   a coating of light-reflecting material discriminately covering ends of fiber claddings of said light-receiving face at said coupling, at least a substantial portion of said covered ends of said fiber claddings being misregistered from alignment with corresponding ends of fiber claddings of said light-emitting face of said coupling whereby a substantial portion of light transmitted from said layer of phosphor through said emitting face and becoming incident upon said covered ends of said claddings of the receiving face will be reflected by said coating back into the fibers which make up said emitting face and thence to said layer of phosphor for diffuse reflection thereby back into said system as useful energy.

2. The improvement in a system of coupled fiber optical faceplates according to claim 1 wherein said ends of said fiber claddings at said light-receiving face are recessed and said light-reflecting material is placed in the recessing.

3. The improvement in a system of coupled fiber optical faceplates according to claim 1 further including a coating of light-reflecting material discriminately placed over ends of fiber claddings adjacent said remaining light-receiving face in said system between said remaining face and said layer of phosphor.

4. The improvement in a system of coupled fiber optical faceplates according to claim 3 wherein said ends of said claddings adjacent said remaining light-receiving face are recessed and said light-reflecting material is placed in the recessing.